(12) United States Patent
Liu et al.

(10) Patent No.: US 12,354,007 B2
(45) Date of Patent: Jul. 8, 2025

(54) ARTIFICIAL INTELLIGENCE (AI)-BASED METHOD FOR NON-CONTACT MEASUREMENT OF SHEET RESISTANCE OF A CONDUCTIVE FILM MATERIAL

(71) Applicant: NORTH UNIVERSITY OF CHINA, Taiyuan (CN)

(72) Inventors: Yaqing Liu, Taiyuan (CN); Guanyu Han, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 19/027,621

(22) Filed: Jan. 17, 2025

(65) Prior Publication Data
US 2025/0156714 A1   May 15, 2025

Related U.S. Application Data

(63) Continuation of application No. PCT/CN2024/092510, filed on May 11, 2024.

(30) Foreign Application Priority Data

May 7, 2024   (CN) .................. 202410555163.X (51) Int. Cl.
G06F 30/18   (2020.01)
G06N 3/08   (2023.01)
(52) U.S. Cl.
CPC ..................... G06N 3/08 (2013.01)
(58) Field of Classification Search
CPC ............ G06F 30/18; G08F 30/20; G06N 3/08

USPC ........................................... 703/5
See application file for complete search history.

(56) References Cited

U.S. PATENT DOCUMENTS

| | | | |
|---|---|---|---|
| 6,119,112 A | 9/2000 | Bush | |
| 2009/0173945 A1* | 7/2009 | Takasawa | H10D 30/6739 204/192.15 |
| 2009/0302834 A1* | 12/2009 | Diaz | G01N 27/9006 324/228 |
| 2013/0346003 A1* | 12/2013 | Gunawan | G01R 27/00 702/65 |
| 2015/0260670 A1* | 9/2015 | Shu | G01N 27/041 702/65 |

(Continued)

FOREIGN PATENT DOCUMENTS

| | | |
|---|---|---|
| CN | 110245413 A | 9/2019 |
| CN | 111209709 A | 5/2020 |
| CN | 115641924 A | 1/2023 |

(Continued)

*Primary Examiner* — Andre Pierre Louis (57) ABSTRACT

An artificial intelligence (AI)-based method for non-contact measurement of sheet resistance of a conductive film material, in which a non-contact measurement method commonly used in the field of electromagnetic wave absorbing-materials is adopted to measure reflection loss data of a wave-absorbing structure Salisbury screen composed of a film material and a substrate; a program-controlled AI model is adopted to predict reflection losses of Salisbury screens with different sheet resistances; the sheet resistance is continuously adjusted, and the range is gradually narrowed to fit the measured reflection loss data; and the sheet resistance of the conductive film materials is inversely deduced.

10 Claims, 10 Drawing Sheets

(56) References Cited

U.S. PATENT DOCUMENTS

2024/0133945 A1* 4/2024 Prabhugoud ......... G01R 27/205

FOREIGN PATENT DOCUMENTS

| CN | 116754835 A | 9/2023 |
| CN | 117709193 A | 3/2024 |

\* cited by examiner

ARTIFICIAL INTELLIGENCE (AI)-BASED METHOD FOR NON-CONTACT MEASUREMENT OF SHEET RESISTANCE OF A CONDUCTIVE FILM MATERIAL

CROSS-REFERENCE TO RELATED APPLICATIONS

This application is a continuation of International Patent Application No. PCT/CN2024/092510, filed on May 11, 2024, which claims the benefit of priority from Chinese Patent Application No. 202410555163.X, filed on May 7, 2024. The content of the aforementioned application, including any intervening amendments thereto, is incorporated herein by reference in its entirety.

TECHNICAL FIELD

This application relates to sheet resistance measurement, and more particularly to an artificial intelligence (AI)-based method for non-contact measurement of sheet resistance of a conductive film material.

BACKGROUND

With the rapid development of new and high-tech industries such as electronic information and functional materials, conductive film, emerging as a promising material, has been widely used in photoelectricity, electric heat, electromagnetic conversion fields. The film materials, such as transparent conductive film materials based on metals and metal oxides for optoelectronic devices, carbon-based conductive film materials based on carbon black, carbon nanotubes, or graphene for electromagnetic wave absorption/shielding, and conductive fiber mats for functional composites to achieve the structural-functional integration, are required to have appropriate electrical properties. Therefore, the sheet resistance measurement of conductive film materials has become one of the key research hotspots in the related fields.

At present, the four-probe method is the most common technique for measuring the sheet resistance of film materials, which is superior to other measurement methods due to its mature theoretical support and simple operation. However, the conventional four-probe method requires direct contact with the to-be-tested film material. On one hand, for those film materials without a protective layer, the probes will cause damage to the fragile samples; and for those film materials with a protective layer, the probes fail to contact the test samples, which leads to a test failure. On the other hand, when measuring the sheet resistance of non-homogeneous film materials, such as chopped carbon fiber mats (CCFM), it will also generate significant testing errors, and even lead to the test failure. In this regard, the conventional solution is to perform measurements for multiple sampling points and statistically process the data to obtain the effective sheet resistance. However, the practical sampling point selection and data post-processing processes are not only cumbersome, but also introduce human factors, which will significantly reduce the testing efficiency and data reliability.

SUMMARY

In view of the deficiencies in the conventional four-probe method in the sheet resistance measurement of film materials, this application provides an artificial intelligence (AI)-based method for non-contact measurement of sheet resistance of a conductive film material.

Technical solutions of this application are described as follows.

This application provides an artificial intelligence (AI)-based method for non-contact measurement of sheet resistance of a conductive film material, comprising:

(S1) based on a material type of the to-be-tested conductive film material, determining a sheet resistance range of the to-be-tested conductive film material as $R_{sq1}$-$R_{sqn}$;

(S2) based on the sheet resistance range $R_{sq1}$-$R_{sqn}$, a material texture of a first to-be-used test substrate, and a thickness range $h_1$-$h_n$ of the first to-be-used test substrate, constructing a structural dataset and training an AI model through steps of:

based on a Salisbury screen I with a conventional electromagnetic wave-absorbing structure Salisbury screen constituted by the to-be-tested conductive film material, the material texture of the first to-be-used test substrate, and the thickness range $h_1$-$h_n$ of the first to-be-used test substrate, setting the structural dataset consisting of the sheet resistance range $R_{sq1}$-$R_{sqn}$, the thickness range $h_1$-$h_n$, and the material texture of the first to-be-used test substrate as an input set;

obtaining electromagnetic wave reflection losses $RL_{sim}$ respectively corresponding to individual groups of the structural dataset in the input set by using a microwave radio frequency simulation software as an output set; and training an artificial neural network through a training algorithm; and obtaining adaptively a mapping relationship between the structural dataset of the Salisbury screen I in the input set and the corresponding $RL_{sim}$ in the output set; and obtaining an AI model that is capable of accurately predicting and outputting a corresponding electromagnetic wave reflection loss $RL_{pre}$ data when a first structural data within the structural dataset of the Salisbury screen I is input;

(S3) experimentally obtaining an electromagnetic wave reflection loss $RL_{test}$ data of a Salisbury screen II of an actual test sample constituted by the to-be-tested conductive film material and a second to-be-used test substrate whose thickness h is within the thickness range $h_1$-$h_n$ and material texture is as same as that of the first to-be-used test substrate;

(S4) embedding the AI model obtained in step (S2) into a step-by-step search algorithm program to quickly predict an electromagnetic wave reflection loss $RL_{pre}$ data of a Salisbury screen III to obtain a step-by-step AI-based sheet resistance search program, wherein the Salisbury screen III is temporarily generated during an operation of the step-by-step search algorithm program, and a second structural data consists of a conductive film material with a sheet resistance falling within the sheet resistance range $R_{sq1}$-$R_{sqn}$ and the second to-be-used test substrate;

inputting the sheet resistance range $R_{sq1}$-$R_{sqn}$ and the thickness h of the second to-be-used test substrate of the Salisbury screen II in step (S3) into the step-by-step AI-based sheet resistance search program;

determining a total iteration number j according to a required operation precision i, expressed as $$j = \left\lceil \log_{\frac{1}{n}} i \right\rceil,$$

wherein n is a number of sheet resistance range $R_{sq1}{}^k$-$R_{sqn}{}^k$ divided in a single iteration; and simultaneously importing the $RL_{test}$ data obtained in step (S3) into the step-by-step AI-based sheet resistance search program, and obtaining the sheet resistance of the to-be-tested conductive film material after j iterations.

In an embodiment, in step (S2), the AI model is trained through steps of:

(S2-1) generating m groups of the first structural data of the wave-absorbing structure Salisbury screen I within a set constituted by the sheet resistance range $R_{sq1}$-$R_{sqn}$ of the to-be-tested conductive film material and the thickness range $h_1$-$h_n$ of the first to-be-used test substrate; and in combination with the material texture of the first to-be-used test substrate, performing modeling simulation on the m groups of the first structural data of the Salisbury screen I by using the microwave radio frequency simulation software to obtain m $RL_{sim}$ data respectively corresponding to the m groups of the first structural data of the Salisbury screen I;

(S2-2) taking the m groups of the first structural data of the Salisbury screen I as an input set and a corresponding m $RL_{sim}$ data as the output set, and dividing proportionally the input set and the output set into a training set, a validation set, and a test set, respectively;

(S2-3) training the artificial neural network using dataset constructed in step (S2-2), which includes the training set, the validation set, and the test set, through the training algorithm; evaluating a training effect based on mean square error and linear regression during a training process; and obtaining the AI model that is capable of predicting and outputting the corresponding electromagnetic wave reflection loss $RL_{pre}$ data when the first structural data within the structural dataset of the Salisbury screen I is input.

In an embodiment, in step (S4), the step-by-step AI-based sheet resistance search program is performed through steps of:

(S4-1) inputting the sheet resistance range $R_{sq1}$-$R_{sqn}$ determined in step (S1), the $RL_{test}$ data of the Salisbury screen II obtained in step (S3), the thickness h of the second to-be-used test substrate of the Salisbury screen II in step (S3), and the total iteration number j determined in step (S4) into the step-by-step AI-based sheet resistance search program;

(S4-2) assigning the sheet resistance range $R_{sq1}$-$R_{sqn}$ determined in step (S1) to the sheet resistance range $R_{sq1}{}^k$-$R_{sqn}{}^k$ in the single iteration, wherein k is a current iteration number, and k≤the total iteration number j;

(S4-3) dividing the sheet resistance range $R_{sq1}{}^k$-$R_{sqn}{}^k$ into n sheet resistance values at equal intervals; and in combination with the thickness h of the second to-be-used test substrate in step (S3), generating temporarily n groups of structural data of the Salisbury screen III during an iteration process;

(S4-4) inputting the n groups of the second structural data of the Salisbury screen III into the AI model obtained in step (S2), and predictedly obtained n $RL_{pre}$ data respectively corresponding to the n groups of the second structural data of the Salisbury screen III;

(S4-5) evaluating a fitting degree between the $RL_{test}$ data of the Salisbury screen II and the n $RL_{pre}$ data of the Salisbury screen III, respectively, wherein the fitting degree is evaluated with fitness as an indicator, and $$\text{fitness} = \sum_{2}^{18} |RL_{test} - RL_{pre}|,$$

and the more a value of the fitness approaches 0, the higher the fitting degree;

(S4-6) selecting a sheet resistance $R_{sq}{}^k$ of the Salisbury screen III with a highest fitting degree in the current iteration; reducing the sheet resistance range $R_{sq1}{}^k$-$R_{sqn}{}^k$ of the current iteration with $R_{sq}{}^k$ as a center, so as to obtain a sheet resistance range $R_{sq1}{}^{k+1}$-$R_{sqn}{}^{k+1}$ for a next iteration; and repeating steps (S4-3)-(S4-6) for multiple iterations; and (S4-7) terminating the iteration process after reaching the total iteration number j preset in step (S4-1); and outputting a sheet resistance $R_{sq}$ of the Salisbury screen III with the highest fitting degree in all of the iterations as the sheet resistance of the to-be-tested conductive film material.

In an embodiment, in step (S1), the sheet resistance range $R_{sq1}$-$R_{sqn}$ is 0.001-300 Ω/sq.

In an embodiment, the thickness range $h_1$-$h_n$ of the first to-be-used test substrate is 1-20 mm; the thickness range h of the second to-be-used test substrate is 1.5-19.5 mm;

the material texture of the first to-be-used test substrate and the second to-be-used test substrate is the same, both made of a resin material, a fiber-reinforced resin matrix composite, or a foam material;

the training algorithm is a back propagation algorithm, a gradient descent algorithm, a momentum optimization algorithm, or an adaptive learning rate algorithm; and the artificial neural network is a feedforward neural network, a convolutional neural network, a recurrent neural network, or a generative adversarial network.

In an embodiment, in step (S2-1), m is selected from 100-300; and the m groups of the first structural data of the Salisbury screen I are generated a uniformly-distributed generation, a gradient-distributed generation, or a randomly-distributed generation within the set.

In an embodiment, in step (S2-2), the dataset is divided according to a proportion of the training set is 50%-80%, the validation set is 10%-25%, and the test set is 10%-25%.

In an embodiment, in step (S3), the $RL_{test}$ data is obtained by a non-contact electromagnetic wave-absorbing material test method selected from the group consisting of an arch method, a free space method, a coaxial method or a waveguide method.

In an embodiment, in step (S4), the required operation precision i is Oct. 2, 2010-5; the total iteration number j is 2-10; the number n of the sheet resistance range $R_{sq1}{}^k$-$R_{sqn}{}^k$ divided in the single iteration is 2-20; and the $RL_{test}$ data is imported in a form of .txt, .xlsx, .xls, .csv, or .mat file.

In an embodiment, in step (S4-6), the sheet resistance range $R_{sq1}{}^k$-$R_{sqn}{}^k$ is reduced by 10%-80% during each iteration process.

Compared to the prior art, this application has the following beneficial effects.

(1) The non-contact measurement method provided in this application can essentially solve the technical problems in the traditional four-probe method when applied to the sheet resistance measurement of locally-non-uniform film materials: (i) it fails to control the probe contact position and contact degree; (ii) the probe contact will easily cause the sample damage; (iii) the probe fails to directly contact the conductive medium, thereby reducing the measurement inaccuracy, and even leading to a failure.

(2) Moreover, an AI model is embedded in the algorithm program to complete the prediction of the electromagnetic wave reflection loss (RL) during each iteration process, which not only improve the operation efficiency, but also can make full use of the generalization ability of AI. Moreover, the AI model is applicable to the prediction of the sheet resistance within the training range or outside the training range only after a single training process.

(3) The sheet resistance extraction method of the present disclosure is applicable to various film materials. The sheet resistance of the film materials can be output directly without multiple tests and complicated statistical analysis, allowing for more convenient and efficient operation and wider application range compared with the traditional extraction method.

(4) Aiming at the problems of the sheet resistance measurement of film materials in the background technology, this disclosure provides the AI-based method for non-contact measurement of sheet resistance of conductive film materials. The AI-based method is based on the non-contact measurement method commonly used in the field of electromagnetic wave-absorbing materials to measure the RL data of the wave-absorbing structure Salisbury screen composed of the film material and the substrate. Moreover, the program-controlled AI model is adopted to predict reflection losses of Salisbury screens with different sheet resistances. Moreover, the sheet resistance is continuously adjusted, and the range is gradually narrowed to fit the measured RL data; and the sheet resistance of the conductive film materials is inversely deduced. Therefore, the AI-based method in this disclosure can essentially solve the problems in the traditional four-probe method, improve the measurement accuracy and measurement efficiency, thereby providing theoretical guidance and technical support for the sheet resistance measurement of various film materials.

BRIEF DESCRIPTION OF THE DRAWINGS

The accompanying drawings are incorporated into and form a part of the description, and are used to explain the principles of the disclosure in conjunction with the embodiments.

In order to illustrate technical solutions in embodiments of the present disclosure or the prior art more clearly, the required drawings will be briefly described below. For those skilled in the art, other drawings may also be obtained according to the drawings provided herein without paying creative efforts.

DETAILED DESCRIPTION OF EMBODIMENTS

The present disclosure will be further described in detail below in conjunction with the accompanying drawings and embodiments to understand the above objects, features and advantages of the present disclosure more clearly. It should be noted that embodiments of the present application and the features therein may be combined with each other in the case of no contradiction.

Many details are described below to facilitate the understanding of the present disclosure. However, the present disclosure may also be implemented in other ways different from those described herein. Obviously, described below are merely some embodiments of the disclosure, which are not intended to limit the disclosure.

Embodiments of the present disclosure will be further described in detail below.

Simulation software:
(1) Program writing and artificial intelligence (AI) model training: mathematical computing software MATLAB R2018b;
(2) Electromagnetic simulation: microwave radio frequency (RF) simulation software Computer Simulation Technology (CST) microwave studio 2018.

Embodiment 1

A streamlined AI-based method for non-contact measurement of sheet resistance of a conductive film material included the following steps.

Figure 1:
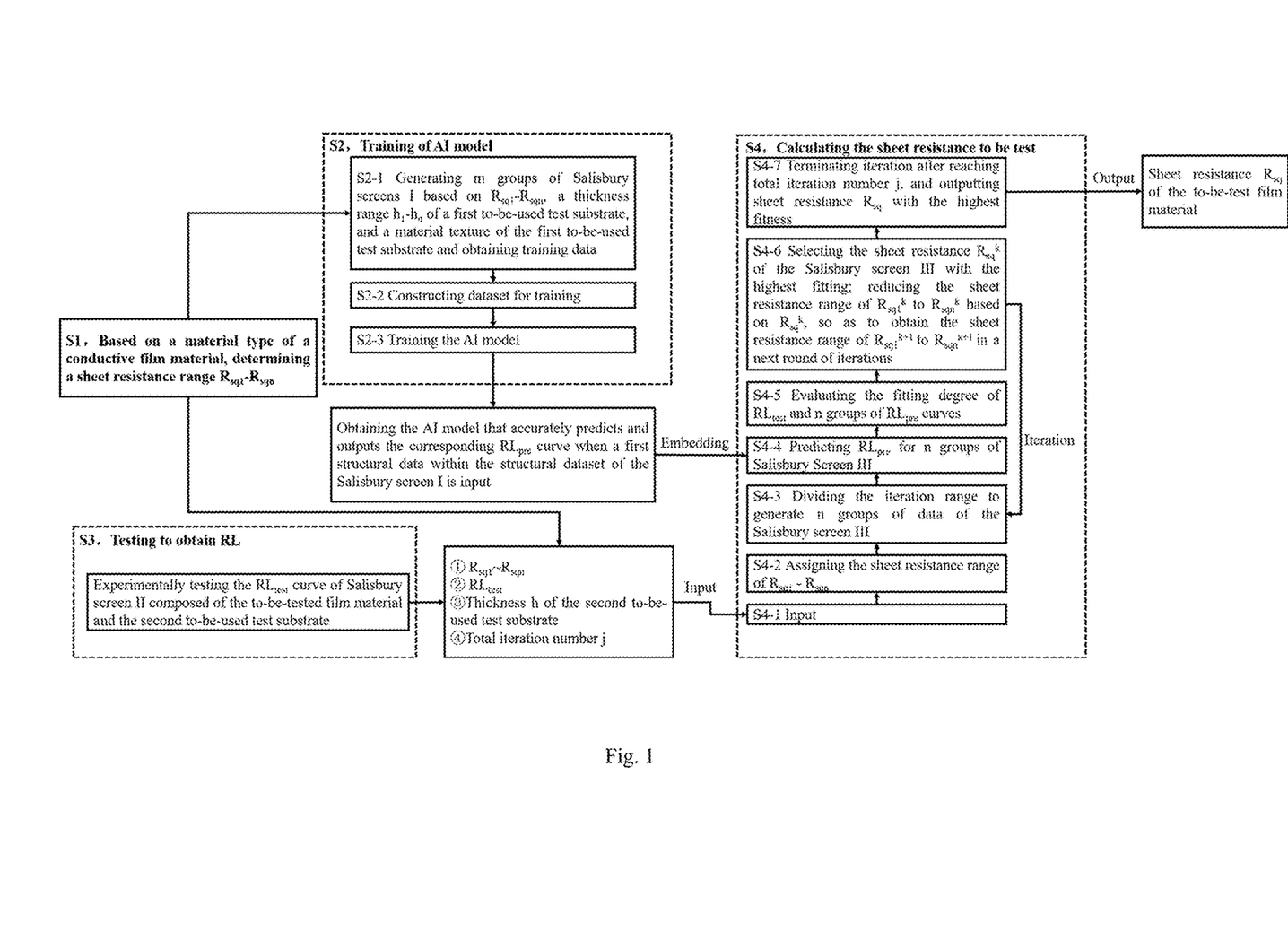
FIG. 1 is a flow chart of an artificial intelligence (AI)-based method for non-contact measurement of sheet resistance of a conductive film material according to an embodiment of the present disclosure.
Figure 2:
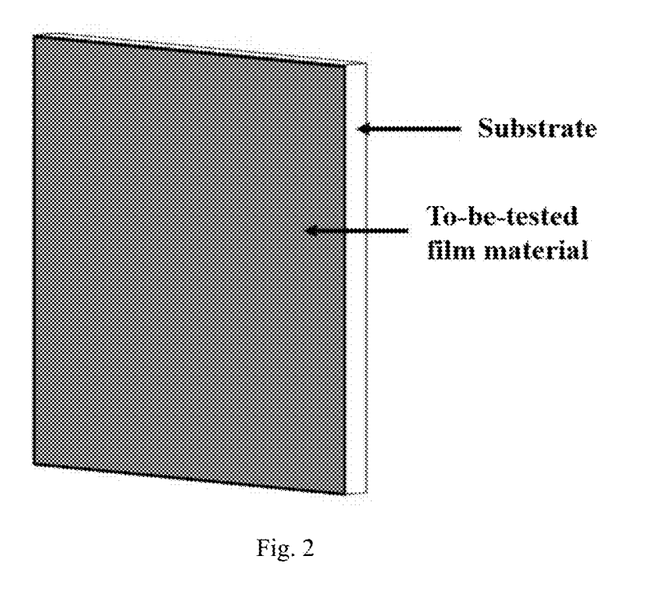
FIG. 2 is a schematic diagram of a wave-absorbing structure Salisbury screen (I, II, III) according to an embodiment of the present disclosure.
Figure 3A:
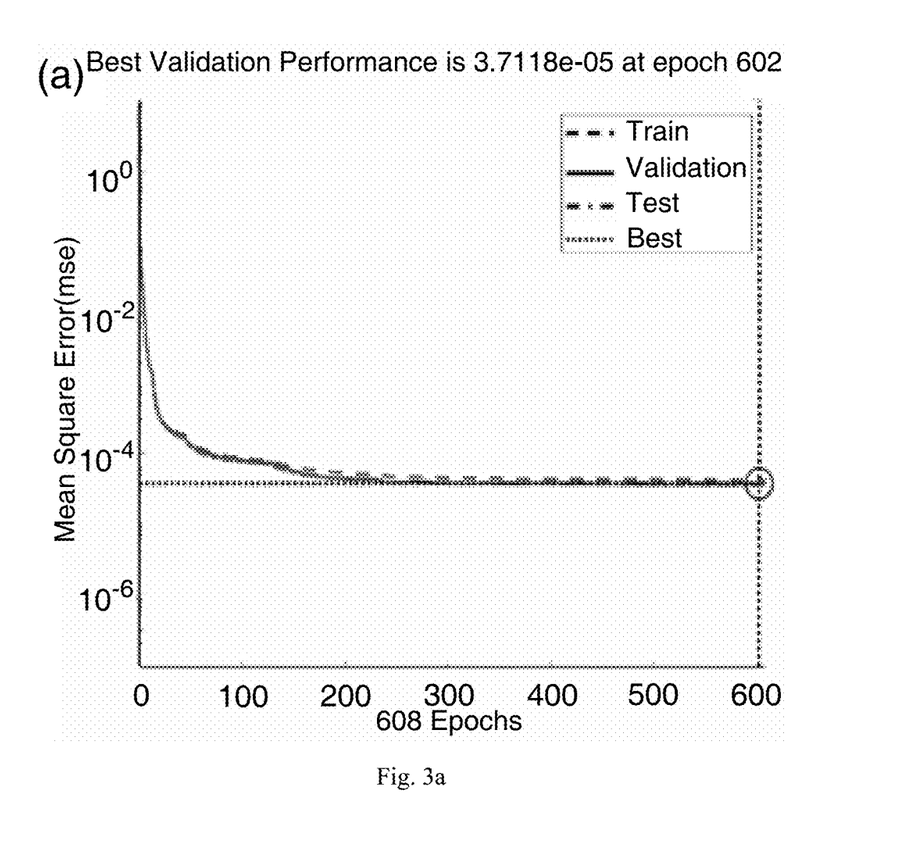
FIG. 3a shows mean square error (MSE) data for evaluation of training effect of an AI model according to Embodiment 1 of the present disclosure.
Figure 3B:
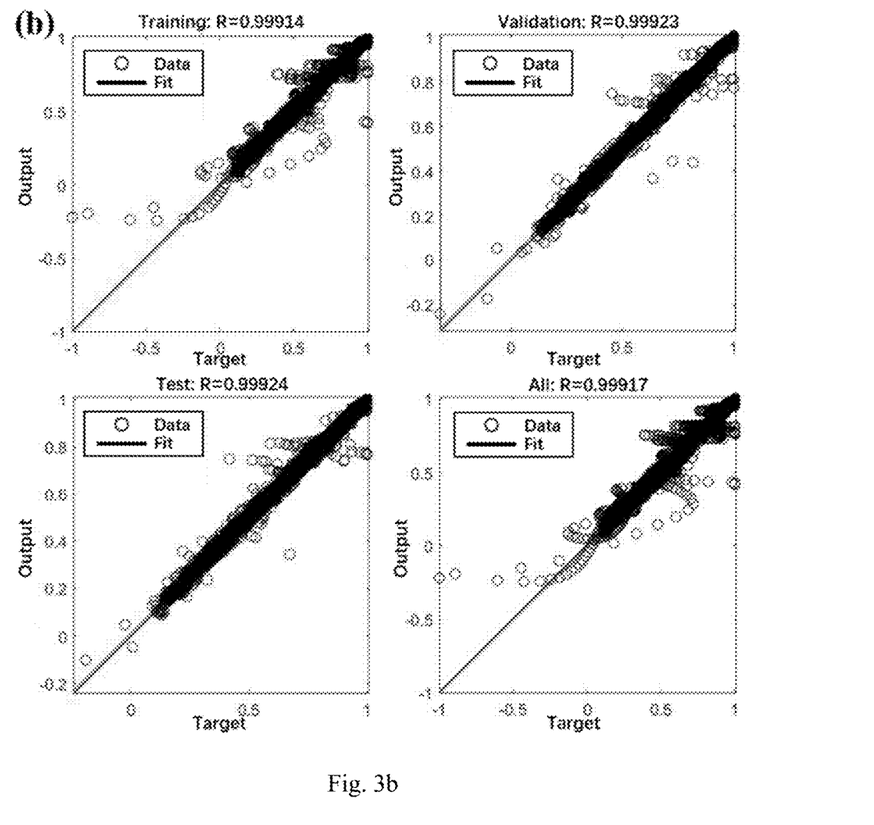
FIG. 3b shows linear regression images for evaluation of training effect of the AI model according to Embodiment 1 of the present disclosure.

The to-be-tested film material was a carbon-based conductive film with a sheet resistance range 0.001-300 Ω/sq. The carbon-based conductive film was used to train the AI model. Sampling points were randomly taken within a set consisting of the sheet resistance range 0.001-300 Ω/sq and a thickness range 1-20 mm of the first to-be-used test substrate. The Salisbury screen I was constituted by the to-be-tested carbon-based conductive film and the first to-be-used test substrate. m groups of the first structural data of the Salisbury screen I were generated, and m=300. CST was controlled by MATLAB code. Automatic modeling simulation was performed based on the material of the first to-be-used test substrate made of a glass fiber-reinforced epoxy resin matrix composite to calculate $RL_{sim}$ data corresponding to the Salisbury screen I. 300 groups of the first structural data of the Salisbury screen I were used as the input set, and the corresponding $RL_{sim}$ data were used as the output set. Specifically, the proportion of the training set is 70%, the proportion of the validation set is 15%, and the proportion of the test set is 15%, thereby obtaining the dataset for AI model training. The feedforward neural network model used herein contained an input layer (3 nodes), a hidden layer 1 (20 nodes), a hidden layer 2 (40 nodes), a hidden layer 3 (20 nodes), and an output layer (1 node). The feedforward neural network model was trained by using the back propagation algorithm. The training results were shown in FIGS. 3a-3b. After 600 epochs of training, the mean-square error (MSE) was decreased to $3.71 \times 10^{-5}$. In addition, the correlation coefficients in the linear regression data of the individual dataset reached 0.999. The above results indicated that the AI model in this embodiment obtained the good training effect.

The Salisbury screen II was composed of the to-be-tested carbon-based conductive film and the glass fiber-reinforced epoxy resin matrix composite substrate, which serves as the second to-be-used substrate, with thickness h=5 mm. The $RL_{test}$ data of the Salisbury screen II was tested using the arch method and imported into the step-by-step search algorithm program in the form of a .txt file. The trained AI model was embedded into the step-by-step search algorithm program. In each iteration, the number n of the second structural data of the Salisbury Screen III temporarily generated was set to 10, and the reduction rate was set to 50%. The input sheet resistance range was 0.001-3000Ω/sq, and the thickness of the glass fiber-reinforced epoxy resin matrix composite test substrate was 5 mm. Based on the required accuracy of $10^{-2}$, the total iteration number was calculated to be 2, and the program was run.

Figure 5A:
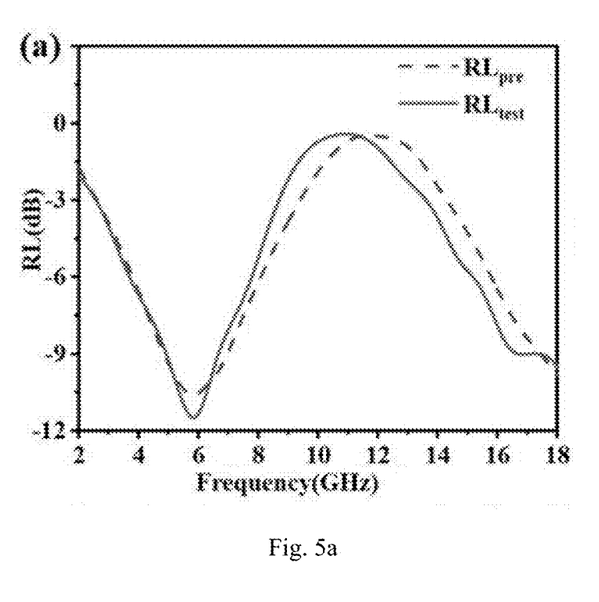
FIG. 5a shows fitting degree between a final prediction result $RL_{pre}$ and a measured result $RL_{test}$ in Embodiment 1 of the present disclosure.

FIG. 5a showed the fitting degree between the $RL_{test}$ obtained from the Salisbury screen II test and the optimal $RL_{pre}$ output by the program in this embodiment, and the sheet resistance of the to-be-tested carbon-based conductive film was 211.80 Ω/sq.

Embodiment 2

The streamlined AI-based method for non-contact measurement of sheet resistance of a conductive film material included the following steps.

The Salisbury screen II was composed of the to-be-tested carbon-based conductive film and the glass fiber-reinforced epoxy resin matrix composite substrate, which serves as the second to-be-used substrate, with thickness h=10 mm. The $RL_{test}$ data of the Salisbury screen II was tested using the arch method and imported into the step-by-step search algorithm program in the form of a .mat file. The AI model trained in the Embodiment 1 was embedded into the step-by-step search algorithm program. In each iteration, the number n of the second structural data of the Salisbury Screen III temporarily generated was set to 20, and the reduction rate was set to 80%. The input sheet resistance range was 0.001-3000Ω/sq, and the thickness of the glass fiber-reinforced epoxy resin matrix composite test substrate was 10 mm. Based on the required accuracy of $10^{-5}$, the total iteration number was calculated to be 2, and the program was run.

Figure 5B:
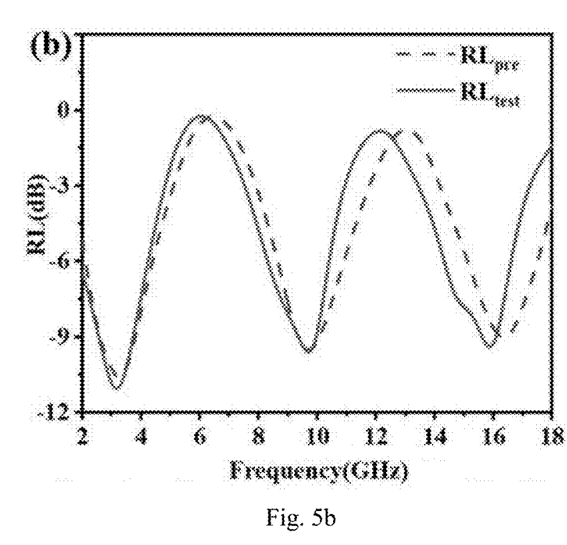
FIG. 5b shows fitting degree between a final prediction result $RL_{pre}$ and a measured result $RL_{test}$ in Embodiment 2 of the present disclosure.

FIG. 5b showed the fitting degree between the $RL_{test}$ obtained from the Salisbury screen II test and the optimal $RL_{pre}$ output by the program in this embodiment, and the sheet resistance of the to-be-tested carbon-based conductive film was 205.31538 Ω/sq, which is almost as same as that obtained in Embodiment 1, indicating the high accuracy of the method of the present disclosure.

Embodiment 3

A streamlined AI-based method for non-contact measurement of sheet resistance of a conductive film material included the following steps.

Figure 4A:
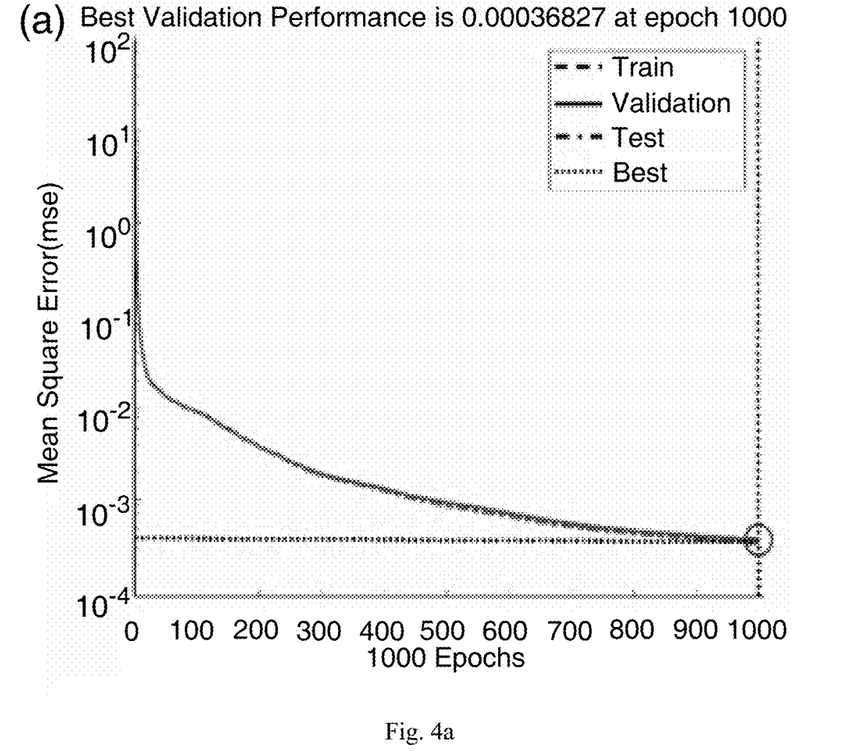
FIG. 4a shows mean square error (MSE) data for evaluation of training effect of an AI model according to Embodiment 3 of the present disclosure.
Figure 4B:
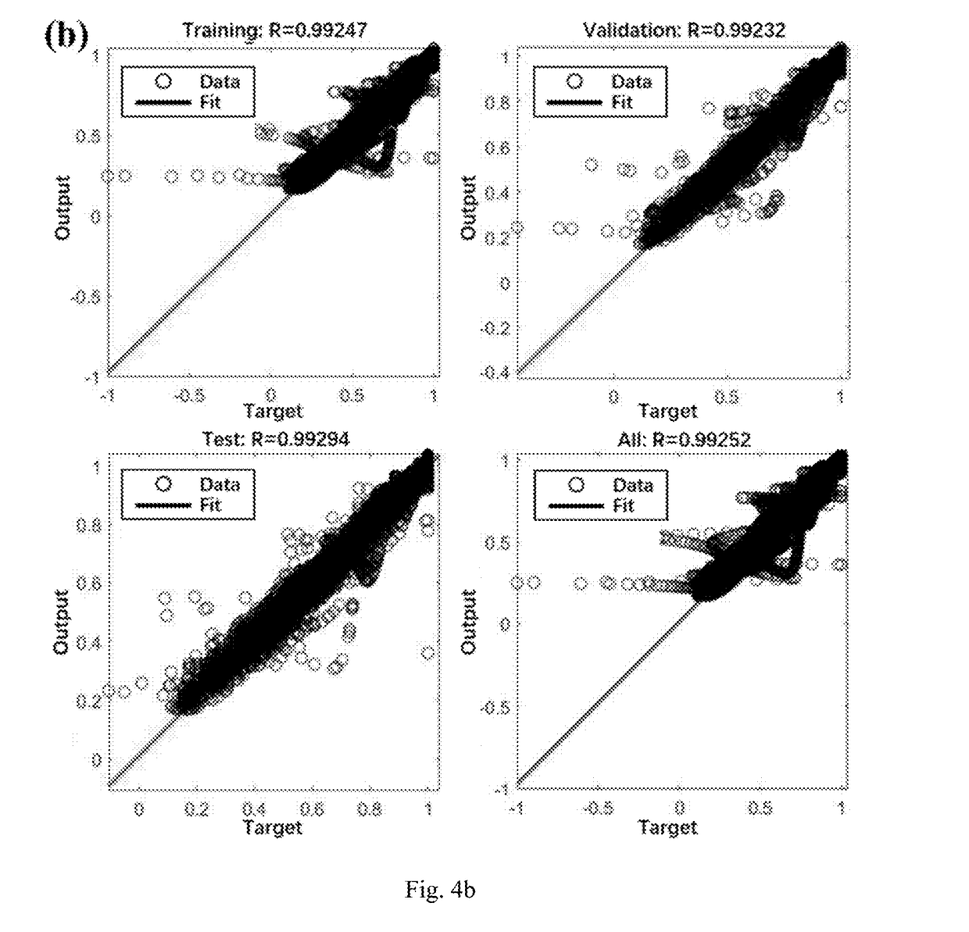
FIG. 4b shows linear regression images for evaluation of training effect of the AI model according to Embodiment 3 of the present disclosure.

The to-be-tested film material was a chopped carbon fiber mats (CCFM) with the sheet resistance range 0.001-100 Ω/sq. The CCFM was used to train the AI model. Sampling points were randomly taken within the set consisting of the sheet resistance range 0.001-100 Ω/sq and the thickness range 1-20 mm of the first to-be-used test substrate. The Salisbury screen I was constituted by the to-be-tested CCFM and the first to-be-used test substrate. m groups of the first structural data of the Salisbury screen I were generated, and m=100. CST was controlled by MATLAB code. Automatic modeling simulation was performed based on the material of the first to-be-used test substrate made of a polyimide foam material to calculate $RL_{sim}$ data corresponding to the Salisbury screen I. 100 groups of the first structural data of the Salisbury screen I were used as the input set, and the corresponding $RL_{sim}$ data were used as the output set. Specifically, the proportion of the training set is 80%, the proportion of the validation set is 10%, and the proportion of the test set is 10%, thereby obtaining the dataset for AI model training. The recurrent neural network model used herein contained an input layer (3 nodes), a hidden layer 1 (20 nodes), a hidden layer 2 (40 nodes), a hidden layer 3 (20 nodes), and an output layer (1 node). The recurrent neural network model was trained by using the gradient descent algorithm. The training results were shown in FIGS. 4a-4b. After 1000 epochs of training, the mean-square error (MSE) was decreased to $3.68 \times 10^{-4}$. In addition, the correlation coefficients in the linear regression data of the individual datasets reached 0.99. The above results indicated that the AI model in this embodiment obtained the good training effect.

The Salisbury screen II was composed of the to-be-tested CCFM and the polyimide foam substrate, which serves as the second to-be-used substrate, with thickness h=5 mm. The $RL_{test}$ data of the Salisbury screen II was tested using the free-space method and imported into the step-by-step search algorithm program in the form of a .csv file. The trained AI model was embedded into the step-by-step search algorithm program. In each iteration, the number n of the second structural data of the Salisbury Screen III temporarily generated was set to 5, and the reduction rate was set to 10%. The input sheet resistance range was 0.001-100 Ω/sq, and the thickness of the polyimide foam material test substrate was 5 mm. Based on the required accuracy of $10^{-4}$, the total iteration number was calculated to be 6, and the program was run.

Figure 5C:
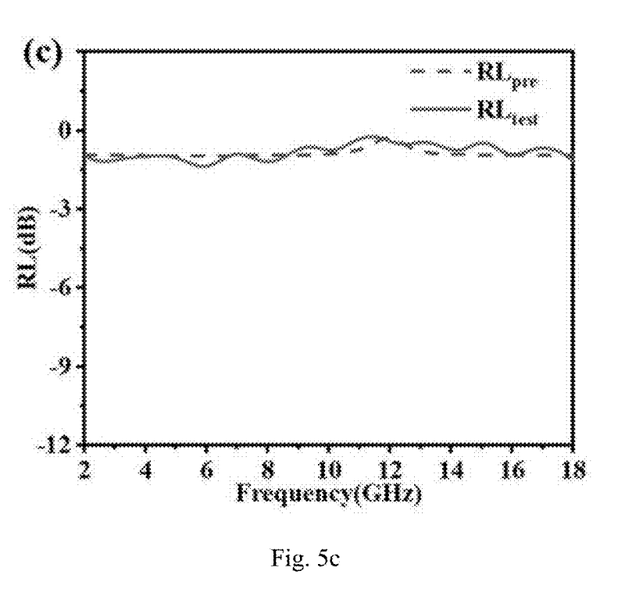
FIG. 5c shows fitting degree between a final prediction result $RL_{pre}$ and a measured result $RL_{test}$ in Embodiment 3 of the present disclosure.

FIG. 5c showed the fitting degree between the $RL_{test}$ obtained from the Salisbury screen II test and the optimal $RL_{pre}$ output by the program in this embodiment, and the sheet resistance of the to-be-tested CCFM was 20.8351 Ω/sq.

Embodiment 4

The streamlined AI-based method for non-contact measurement of sheet resistance of a conductive film material included the following steps.

The Salisbury screen II was composed of the to-be-tested CCFM and the polyimide foam substrate, which serves as the second to-be-used substrate, with thickness h=10 mm. The $RL_{test}$ data of the Salisbury screen II was tested using the free-space method and imported into the step-by-step search algorithm program in the form of a .xslx file. The trained AI model in the embodiment 3 was embedded into the step-by-step search algorithm program. In each iteration, the number n of the second structural data of the Salisbury Screen III temporarily generated was set to 2, and the reduction rate was set to 30%. The input sheet resistance range was 0.001-100 Ω/sq, and the thickness of the polyimide foam material test substrate was 10 mm. Based on the required accuracy of $10^{-3}$, the total iteration number was calculated to be 10, and the program was run.

Figure 5D:
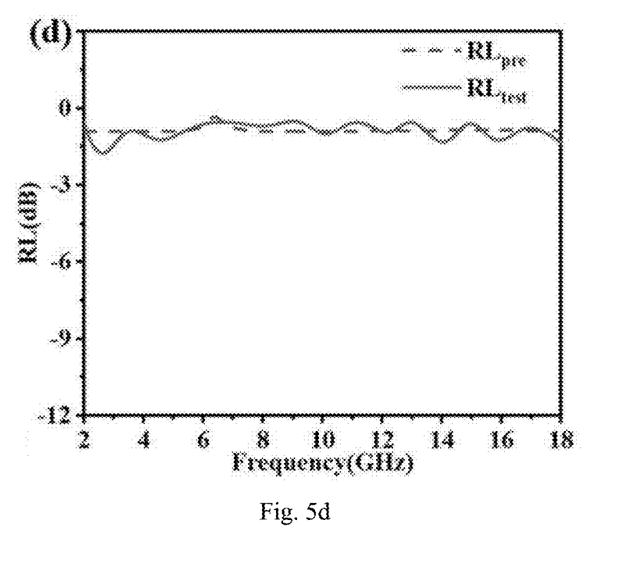
FIG. 5d shows fitting degree between a final prediction result $RL_{pre}$ and a measured result $RL_{test}$ in Embodiment 4 of the present disclosure.

FIG. 5d showed the fitting degree between the $RL_{test}$ obtained from the Salisbury screen II test and the optimal $RL_{pre}$ output by the program in this embodiment, and the sheet resistance of the to-be-tested CCFM was 20.824 Ω/sq, which is almost as same as that obtained in Embodiment 3, indicating the high accuracy of the method of the present disclosure.

In summary, the results indicated that the AI-based method in the present disclosure can realize easy, fast, and effective extraction of the sheet resistance of film materials of various material types and sheet resistance ranges.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. An artificial intelligence (AI)-based method for non-contact measurement of sheet resistance of a conductive film material, comprising:
   (S1) based on a material type of a to-be-tested conductive film material, determining a sheet resistance range of the to-be-tested conductive film material as $Rsql-R_{sqn}$;
   (S2) based on the sheet resistance range $R_{sq1}-R_{sqn}$, a material texture of a first to-be-used test substrate, and a thickness range $h_1-h_n$ of the first to-be-used test substrate, constructing a structural dataset and training an AI model through steps of:
      based on a Salisbury screen I with a conventional electromagnetic wave-absorbing structure Salisbury screen, constituted by the to-be-tested conductive film material, the material texture of the first to-be-used test substrate, and the thickness range $h_1-h_n$ of the first to-be-used test substrate, setting the structural dataset consisting of the sheet resistance range $R_{sq1}-R_{sqn}$, the thickness range $h_1-h_n$, and the material texture of the first to-be-used test substrate as an input set;
      obtaining electromagnetic wave reflection losses $RL_{sim}$ respectively corresponding to individual groups of the structural dataset in the input set by using a microwave radio frequency simulation software as an output set; and
      training an artificial neural network through a training algorithm; and obtaining adaptively a mapping relationship between the structural dataset of the Salisbury screen I in the input set and a corresponding $RL_{sim}$ in the output set; and obtaining an AI model that is capable of accurately predicting and outputting a corresponding electromagnetic wave reflection loss $RL_{pre}$ data when a first structural data within the structural dataset of the Salisbury screen I is input;
   (S3) experimentally obtaining an electromagnetic wave reflection loss $RL_{test}$ data of a Salisbury screen II of an actual test sample constituted by the to-be-tested conductive film material and a second to-be-used test substrate whose thickness h is within the thickness range $h_1-h_n$ and material texture is the same as that of the first to-be-used test substrate;
   (S4) embedding the AI model obtained in step (S2) into a step-by-step search algorithm program to quickly predict an electromagnetic wave reflection loss $RL_{pre}$ data of a Salisbury screen III to obtain a step-by-step AI-based sheet resistance search program, wherein the Salisbury screen III is temporarily generated during an operation of the step-by-step search algorithm program, and a second structural data consists of a conductive film material with a sheet resistance falling within the sheet resistance range $R_{sq1}-R_{sqn}$ and the second to-be-used test substrate;
   inputting the sheet resistance range $R_{sq1}-R_{sqn}$ and the thickness h of the second to-be-used test substrate of the Salisbury screen II in step (S3) into the step-by-step AI-based sheet resistance search program;
   determining a total iteration number j according to a required operation precision i, expressed as $$j = \left\lceil \log_{\frac{1}{n}} i \right\rceil,$$

wherein n is a number of sheet resistance ranges $R_{sq1}{}^k-R_{sqn}{}^k$ divided in a single iteration; and
   simultaneously importing the $RL_{test}$ data obtained in step (S3) into the step-by-step AI-based sheet resistance search program, and obtaining the sheet resistance of the to-be-tested conductive film material after j iterations.

2. The AI-based method of claim 1, wherein in step (S2), the AI model is trained through steps of:
   (S2-1) generating m groups of the first structural data of the Salisbury screen I within a set constituted by the sheet resistance range $R_{sq1}-R_{sqn}$ of the to-be-tested conductive film material and the thickness range $h_1-h_n$ of the to-be-used test substrate; and in combination with the material texture of the first to-be-used test substrate, performing modeling simulation on the m groups of the first structural data of the Salisbury screen I by using the microwave radio frequency simulation software to obtain m $RL_{sim}$ data respectively corresponding to the m groups of the first structural data of the Salisbury screen I;
   (S2-2) taking the m groups of the first structural data of the Salisbury screen I as the input set and the corresponding m $RL_{sim}$ data as the output set, and dividing proportionally the input set and the output set into a training set, a validation set, and a test set, respectively;
   (S2-3) training the artificial neural network using dataset constructed in step (S2-2), which comprises the training set, the validation set, and the test set, through the training algorithm; evaluating a training effect based on mean square error and linear regression during a training process; and obtaining the AI model that is capable of predicting and outputting the corresponding electromagnetic wave reflection loss $RL_{pre}$ data when the first structural data within the structural dataset of the Salisbury screen I is input.

3. The AI-based method of claim 1, wherein in step (S4), the step-by-step AI-based sheet resistance search program is performed through steps of:
   (S4-1) inputting the sheet resistance range $R_{sq1}-R_{sqn}$ determined in step (S1), the $RL_{test}$ data of the Salisbury screen II obtained in step (S3), the thickness h of the second to-be-used test substrate of the Salisbury screen II in step (S3), and the total iteration number j determined in step (S4) into the step-by-step AI-based sheet resistance search program;
   (S4-2) assigning the sheet resistance range $R_{sq1}-R_{sqn}$ determined in step (S1) to the sheet resistance range $R_{sq1}^k$-$R_{sqn}^k$ in the single iteration, wherein k is a current iteration number, and k≤the total iteration number j;

(S4-3) dividing the sheet resistance range $R_{sq1}^k$-$R_{sqn}^k$ into n sheet resistance values at equal intervals; and in combination with the actual thickness h of the second to-be-used test substrate in step (S3), generating temporarily n groups of structural data of the Salisbury screen III during an iteration process;

(S4-4) inputting the n groups of the second structural data of the Salisbury screen III into the AI model obtained in step (S2), and predictedly obtained n $RL_{pre}$ data respectively corresponding to the n groups of the second structural data of the Salisbury screen III;

(S4-5) evaluating a fitting degree between the $RL_{test}$ data of the Salisbury screen II and the n $RL_{pre}$ data of the Salisbury screen III, respectively, wherein the fitting degree is evaluated with fitness as an indicator, and $$\text{fitness} = \sum_{2}^{18} |RL_{test} - RL_{pre}|,$$

and the more a value of the fitness approaches 0, the higher the fitting degree;

(S4-6) selecting a sheet resistance $R_{sq}^k$ of the Salisbury screen III with a highest fitting degree in the current iteration; reducing the sheet resistance range $R_{sq1}^k$-$R_{sqn}^k$ of the current iteration with $R_{sq}^k$ as a center, so as to obtain a sheet resistance range $R_{sq1}^{k+1}$-$R_{sqn}^{k+1}$ for a next iteration; and repeating steps (S4-3)-(S4-6) for multiple iterations;

(S4-7) terminating the iteration process after reaching the total iteration number j preset in step (S4-1); and outputting a sheet resistance $R_{sq}$ of the Salisbury screen III with the highest fitting degree in all of the iterations as the sheet resistance of the to-be-tested conductive film material.

4. The AI-based method of claim 1, wherein in step (S1), the sheet resistance range $R_{sq1}$-$R_{sqn}$ is 0.001-300 Ω/sq.

5. The AI-based method of claim 1, the thickness range $h_1$-$h_n$ of the first to-be-used test substrate is 1-20 mm; the thickness range h of the second to-be-used test substrate is 1.5-19.5 mm;

the material texture of the first to-be-used test substrate and the second to-be-used test substrate is the same, both made of a resin material, a fiber-reinforced resin matrix composite, or a foam material;

the training algorithm is a back propagation algorithm, a gradient descent algorithm, a momentum optimization algorithm, or an adaptive learning rate algorithm; and the artificial neural network is a feedforward neural network, a convolutional neural network, a recurrent neural network, or a generative adversarial network.

6. The AI-based method of claim 2, wherein in step (S2-1), m is selected from 100-300; and the m groups of structural data of the Salisbury screen I are generated a uniformly-distributed generation, a gradient-distributed generation, or a randomly-distributed generation within the set.

7. The AI-based method of claim 2, wherein in step (S2-2), the dataset is divided according to that a proportion of the training set is 50%-80%, a proportion of the validation set is 10%-25%, and a proportion of the test set is 10%-25%.

8. The AI-based method of claim 1, wherein in step (S3), the $RL_{test}$ data is obtained by a non-contact electromagnetic wave-absorbing material test method selected from the group consisting of an arch method, a free space method, a coaxial method, or a waveguide method.

9. The AI-based method of claim 1, wherein in step (S4), the required operation precision i is $10^{-2}$-$10^{-5}$; the total iteration number j is 2-10; the number n of the sheet resistance range $R_{sq1}^k$-$R_{sqn}^k$ divided in the single iteration is 2-20; and the $RL_{test}$ data is imported in a form of .txt, .xlsx, .xls, .csv, or .mat file.

10. The AI-based method of claim 3, wherein in step (S4-6), the sheet resistance range $R_{sq1}^k$-$R_{sqn}^k$ is reduced by 10%-80% during each iteration process.

\* \* \* \* \*